Patented Mar. 13, 1923.

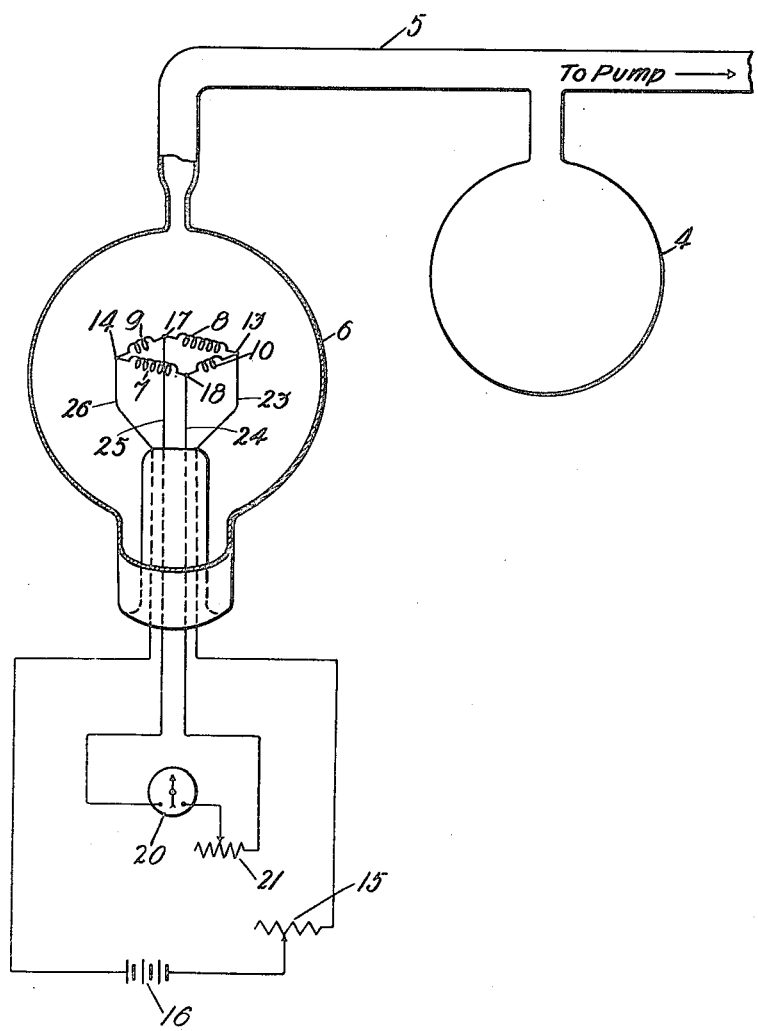

1,448,540

UNITED STATES PATENT OFFICE.

WILLIAM G. HOUSKEEPER, OF PHILADELPHIA, PENNSYLVANIA, ASSIGNOR TO WESTERN ELECTRIC COMPANY, INCORPORATED, OF NEW YORK, N. Y., A CORPORATION OF NEW YORK.

APPARATUS FOR MEASURING GAS PRESSURES.

Application filed July 14, 1917. Serial No. 180,687.

*To all whom it may concern:*

Be it known that I, WILLIAM G. HOUSKEEPER, a citizen of the United States, residing at Philadelphia, in the county of Philadelphia and State of Pennsylvania, have invented certain new and useful Improvements in Apparatus for Measuring Gas Pressures, of which the following is a full, clear, concise, and exact description.

This invention relates to apparatus for measuring gas pressure, and in particular for measuring minute pressures, such as are present in vacuum tubes used for electric lamps and the like.

Its object is to provide a more convenient method than has heretofore been employed for measuring such pressures. A further object is to provide a device which indicates continuously the degree of evacuation in a vessel.

In accordance with this invention, a resistance is inserted in the vacuum to be measured and means is provided for passing a current therethrough. The temperature to which the resistance will be heated by said current will depend upon the amount of heat radiated into space, and the amount conducted away by the lead wires and by the particles of air surrounding the resistance. The amount lost by radiation and the amount conducted away by the lead wires will, for a given temperature be independent of the degree of evacuation of the vessel containing the resistance, but the amount of heat carried away by the air particles, will, of course, be proportional to the number of air particles present in a unit volume of the vessel. The temperature to which the resistance is raised by a given current, therefore, depends upon the degree of evacuation of the vessel. If, now, said resistance is composed of a substance, the resistance of which changes with temperature, then it follows that the value of the resistance in said vessel will be an indication of the degree of evacuation present.

Inasmuch as one of the most sensitive and reliable methods of measuring resistances or indicating changes in resistances is the Wheatstone bridge, I have made use of such a circuit to carry out my invention, and this will be better understood by reference to the following description and accompanying drawing, which represents an embodiment of this invention.

In the drawing 4 represents a vessel, the gas pressure of which is to be measured. A connecting tube 5 extends from this vessel to a vessel 6 in which is enclosed a Wheatstone bridge arrangement of resistances comprising the arms 7 to 10 inclusive. Between the points 13 and 14 are connected an adjustable resistance 15 and a source of current 16. Between the opposite points 17 and 18 are connected a suitable current measuring instrument 20 and an adjustable resistance 21. The resistances composing the Wheatstone bridge are shown to be supported by the leading-in wires 23 to 26 inclusive.

In order that the device may work efficiently, it is preferable that the two pairs of resistances 7 and 8 and 9 and 10 should have appreciably different temperature coefficients of resistance. This may be accomplished by having one pair, say 7 and 8, composed of a material, the resistance of which increases with increase of temperature, and by having the other pair 9, and 10, composed of a material, the resistance of which either decreases with increase of temperature or has practically a zero coefficient of change of resistance with temperature. When the four arms are so constructed for a given degree of evacuation that there is a balance of the bridge, that is, the points 17 and 18 are at the same potential, a change in the amount of evacuation of the vessel will mean an unbalancing of the bridge and a deflection in the instrument 20 due to the change in resistance of the arms caused by the temperature changing with the pressure. The amount of the deflection will depend upon the amount of change in the evacuation of said vessel, and the direction of the deflection will be an indication whether the change in the evacuation was an increase or a decrease.

It is apparent that, having calibrated the instrument for various known values of pressure in the evacuated vessel, the galvanometer scale may be made to read in any desired system of units; and by properly adjusting the resistances 15 and 21, the scale of the instrument may be varied so as to have any desired range.

In one embodiment of this invention one pair of resistances 7 and 8, for example, was made of platinum, which has a positive temperature coefficient of resistance and the other arms 9 and 10 are composed of nichrome, the resistance of which does not change with temperature, but it is to be understood that this invention is not limited to the use of the above-mentioned materials. It is only necessary that the two materials have different temperature coefficients of resistance in order that the device may function properly. A satisfactory device, under certain conditions, may also be made by having one pair of a material with a positive temperature co-efficient, like platinum, silver, nickel or the like, and the other pair composed of material like carbon, which has a negative temperature coefficient. The substances used, however, should preferably comprise metals that do not oxidize to an appreciable extent at ordinary pressures, where there is enough oxygen present in the enclosing vessel to produce oxidation. Otherwise the Wheatstone bridge would need frequent adjustment because of the resistance of the various arms changing as they are oxidized. However, if non-oxidizable materials are employed, the construction of this invention may be employed to indicate continuously the degree of pressure existing in a vessel from the time the evacuation is started at atmospheric pressure until the vessel has been evacuated to a pressure as low as $10^4$ mm. or even lower.

What is claimed is:

1. Means for measuring gas pressure comprising a vessel containing a plurality of resistance elements having different temperature coefficients of resistance.

2. Means for measuring pressures comprising a vessel containing gas subjected to a pressure bearing a known relation to that to be measured, and a Wheatstone bridge network in said vessel.

3. Means for measuring gas pressure comprising a vessel the interior of which is subject to the pressure to be measured, a plurality of resistance elements therein, means for supplying current to said elements, and means for measuring changes in resistance in one of said elements due to changes in the temperature.

4. Means for measuring gas pressure comprising a vessel containing gas subjected to a pressure proportional to that to be measured, a plurality of resistance elements therein, means for heating said elements, and means for measuring the resistance of one of said elements.

5. Means for measuring gas pressure comprising a vessel containing a resistance element having a zero temperature coefficient of resistance.

6. In apparatus for measuring vacua, the combination with an evacuated vessel of a Wheatstone bridge network therein.

7. Means for measuring gas pressure comprising a Wheatstone bridge in which the resistance elements of the arms do not all have the same temperature coefficient of resistance.

8. Means for measuring gas pressure comprising a vessel containing a conductive network having a plurality of branches, a source of current for said network, and a calibrated current indicating instrument attached to said network whereby the pressure is continuously indicated.

9. Means for measuring gas pressure comprising a vessel, a plurality of resistance elements therein having the same temperature coefficient of resistance, and more than two external electrical connections for said resistance elements.

10. An evacuated vessel containing a network having a plurality of branches, one branch thereof containing a resistance, means for measuring the change of the value of said resistance with temperature, whereby a change in the evacuation of said vessel may be noted.

11. An evacuated vessel containing a Wheatstone bridge network, said network containing resistances having unequal temperature coefficients of resistance, a source of current for said network, and means connected to said network and adapted to detect the change in the resistance of said network due to a change in the evacuation of said vessel.

12. An evacuated vessel containing a Wheatstone bridge network, said network containing resistances having unequal temperature coefficients of resistance, a source of current for said network whereby the resistances having unequal temperature coefficients may be heated, and a measuring instrument connected to said network and adapted to measure changes in the evacuation of said vessel due to the resulting changes in the values of said resistances.

13. The combination with an evacuated vessel, of apparatus for measuring the pressure within said vessel, said apparatus comprising a vessel containing four resistances arranged in the form of a Wheatstone bridge network, said resistances having unequal temperature coefficients, a source of current connected between two opposite junctions of said resistances, and a measuring instrument connected between the other two junctions.

14. Means for measuring gas pressure comprising a vessel, the interior of which is subject to the pressure to be measured, a plurality of resistance elements therein, said resistance elements being composed of material non-oxidizable at ordinary pressures, means for heating said elements and means for measuring the resistance of one of said elements.

In witness whereof, I hereunto subscribe my name this twelfth day of July, A. D. 1917.

WILLIAM G. HOUSKEEPER.